Figure 1:
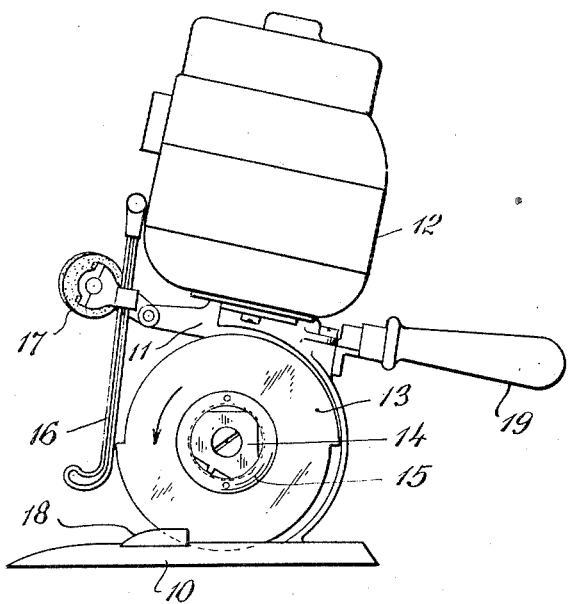

Feb. 23, 1932.     W. BANGSER     1,846,020

CLOTH CUTTING MACHINE

Filed Aug. 15, 1930

INVENTOR
William Bangser
BY
Pennie, Davis, Marvin & Edmonds
his ATTORNEYS

Patented Feb. 23, 1932

1,846,020

UNITED STATES PATENT OFFICE

WILLIAM BANGSER, OF NEW YORK, N. Y., ASSIGNOR TO H. MAIMIN COMPANY, INCORPORATED, A CORPORATION OF NEW YORK

CLOTH-CUTTING MACHINE

Application filed August 15, 1930. Serial No. 475,456.

This invention relates to cloth-cutting machines of the rotary blade type and has to do particularly with certain improvements in the blades or knives used on such machines.

The blade in common use on cloth-cutting machines of the rotary type is in the form of a circular disk having a beveled cutting edge. It is provided with a central aperture which is slipped over a rotatable hub carried on the standard of the machine and passes adjacent its lower edge through a slotted throat in the base of the machine. In operation the machine with its blade rotating in a vertical plane is moved forward in the plane of the blade through the layers of cloth being cut. The action is a scoring action depending upon the rotary motion of the blade and the forward motion of the machine; the blade being literally pushed through the cloth. I have discovered that an improved cutting action is obtained by the use of a blade having a cutting edge in the form of a curve whose radius with respect to the axis of rotation continuously increases during each cutting action. Preferably I employ a blade having a spiral or spiral-like cutting edge. Thus the cutting is effected by a series of modified chopping strokes, the depth of penetration of the blade gradually increasing through each rotation or part thereof.

Cloth-cutting machine blades are subjected to hard usage and are quickly dulled. It is, therefore, necessary that means be provided for quickly resharpening the blades without removing them from the machine. It is common practice to mount a pair of grindstones above and in front of the blade and provide means whereby the operator can swing these stones into contact with the rotating blade whenever the need arises. No blade having a cutting edge departing too far from circular form would be practical because it could not be readily sharpened. My blade, although not circular, can be readily sharpened by the stones with which cloth-cutting machines are now equipped.

A blade of the present invention having a spiral cutting edge must rotate only in one direction with reference to the cloth being cut. In order to insure that the blade be properly mounted and rotate in the proper direction I make the central, hub-receiving aperture in the blade non-symmetrical in form, and similarly shape the hub so that the blade can be mounted only in one way and cannot be inadvertently reversed by a careless operator. This same expedient is also useful in the case of circular blades. These blades are provided with a beveled cutting edge, the bevel extending from the outer to the inner face with the cutting edge itself lying in the plane of the inner face. The blade lies very close to the standard, the clearance being too small to permit the insertion of part of the cloth between the blade and standard. Should, however, the blade be reversed when mounted the cutting edge is spaced from the standard the thickness of the blade plus the clearance, and this is frequently enough to permit the cloth to become jammed between the blade and the standard. It is, therefore, important that means be provided for making it impossible for the operator to reverse the blade when mounting it.

Figure 4:
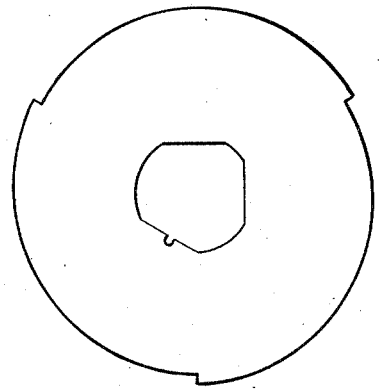
Figure 2:
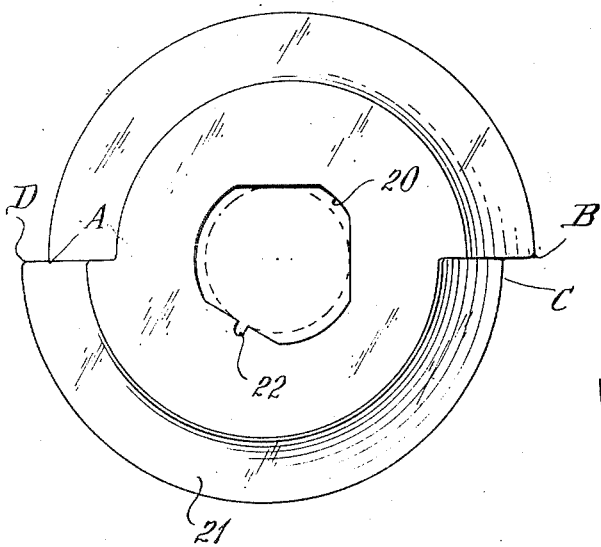
Figure 5:
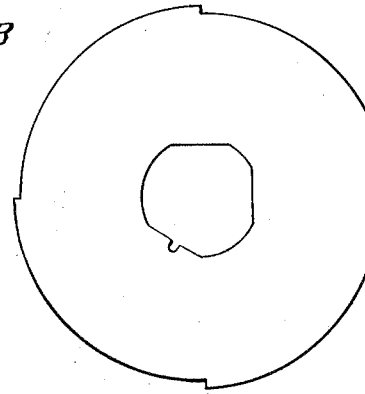

In the accompanying drawings I have illustrated a cloth-cutting machine equipped with the novel blade of my invention and also a number of different forms of the blade itself. In these, Figure 1 is a side elevation of a cloth-cutting machine of the rotary blade type equipped with one of my blades; Figure 2 is an enlarged view of the blade shown in Figure 1 showing in greater detail the shape of the hub-receiving aperture, the cutting edge of this blade consisting of two spirals; and Figures 3, 4 and 5 are illustrations of other blades, the cutting edges of which comprise one, three and four spirals respectively.

The cloth-cutting machine illustrated in Figure 1 is of the conventional type comprising a supporting base 10 on which is mounted a standard 11, a motor 12 and a blade 13. The blade is mounted upon a rotatable hub 14 journaled in the standard and driven by the motor through bevel gears, not illustrated. The blade is held in place on the hub by means of a screw-threaded ring 15. Extending downward in front of the blade is a combination guard and presser-foot 16, and pivotally mounted above and in front of the blade are a pair of grindstones 17 designed, when used, to be swung downward and into contact with the cutting edge of the blade. The lowermost section of the cutting edge of the blade lies below the upper face of the base and in reaching this position passes through the slotted throat 18. The machine is guided by means of a handle 19. The foregoing represents a common type of rotary blade cloth-cutting machine.

The cutting edge of the blade illustrated instead of being circular, as are all blades now in use, consists of two spiral-like curves. Thus with reference to Figure 2, the radius of the cutting edge of the upper half of the blade at point A is a minimum which increases to a maximum at point B. The curvature of the cutting edge of the lower half of the blade similarly begins with a minimum at point C and increases to a maximum at point D. Two shoulders DA and BC are thereby formed on the edge of the blade.

Figure 3:
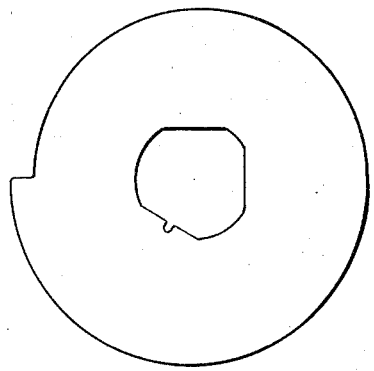

Figure 3 is similar to Figure 2 except that the blade of that figure has a cutting edge comprising a single spiral and in consequence a single shoulder. The blade of Figure 4 has three spirals and the blade of Figure 5, four.

In operation the blade, rotating in the direction of the arrow exerts a cutting action irrespective of the bodily movement of the machine itself, due to the fact that as the blade rotates the effective radius of its cutting edge increases throughout the length of any given spiral. I have found in actual practice that a blade of this nature when used on a cloth-cutting machine, manipulated in the usual way, cuts more efficiently and can perform the same amount of cutting as a circular blade with less power. It is particularly useful in cutting tough, heavy goods.

The blade of the present invention can be sharpened by means of the grindstone 17 precisely as a circular blade is sharpened. It is true that the points D and B gradually become rounded and after long service the blade approaches circular form, but until this happens the blade does operate more efficiently.

The blade is provided with a central aperture 20 designed to fit over the rotatable hub 14. As illustrated I have made this aperture non-symmetrical and have also made the hub of a corresponding non-symmetrical form so that the blade can be mounted upon the hub only in one way. If the operator attempts to reverse the blade so that when rotated the shoulders between the spirals would strike against the cloth, the aperture 20 simply will not fit over the hub 14 and the operator must reverse the blade and mount it properly. The cutting edge of each blade is beveled as illustrated at 21. It is important that this bevel should face outward not only when using the non-circular blade illustrated, but when using the ordinary circular blade in order to avoid jamming of the cloth between the knife and the standard as before described, and, when a grindstone is employed, to prevent destruction of the cutting edge of the knife when the grindstone is moved into contact with the blade. The use of my non-symmetrical aperture and non-symmetrical hub makes it impossible for any blade to be improperly mounted.

The hub 14 is provided with a threaded periphery and receives the ring 15 in the usual way. The threads are simply interrupted where segments have been cut from the hub to make it non-symmetrical in accordance with the present invention.

In order to make it possible to use the new blades on old machines provided with the usual circular hub I have made the hub of the new machine slightly larger than the old hub. Referring to Figure 2 the dotted circle represents the diameter of the hub in the old machine. Thus the new blade can be fitted over it. In the old machine it was always necessary to provide the hub or parts adjacent with a pin extending through a hole or slot in the blade to insure rotation. With my new blade having a non-symmetrical aperture this is not necessary, but in order to use the new blades on the old machines I have provided a notch 22 which fits over a pin or hub of the old machine in the usual way.

I claim:

1. In a cloth cutting machine the combination of a standard, a rotatable hub projecting from the standard and having a portion of non-symmetrical cross-section, a rotary blade having a beveled cutting edge and having an opening of non-symmetrical shape adapted to be received upon the non-symmetrical portion of the hub, the construction being such that the blade can be assembled with the hub only with its beveled surface away from the standard.

2. A disc blade for use with a cloth-cutting machine of the type having a rotatable hub adapted to have the blade inserted thereupon from one end, said blade having a cutting edge adapted to occupy a correct operative position in the machine and also having means located centrally of the blade so constructed and arranged that the blade is capable of being received upon the hub only when a predetermined face of the blade is initially engaged with the free end of the hub.

3. A disc blade for use with a cloth-cutting machine of the type having a rotatable hub provided with a portion of non-symmetrical cross-section and adapted to have the blade inserted thereon from one end of the hub, said blade having a beveled cutting edge extending from face-to-face and also having an aperture centrally located therein and of a shape corresponding to the non-symmetrical portion of the hub, whereby the blade is capable of being received upon the hub only when a predetermined face of the blade is initially engaged with the free end of the hub.

In testimony whereof I affix my signature.

WILLIAM BANGSER.